(12) United States Patent
Guddei et al.

(10) Patent No.: US 11,949,312 B2
(45) Date of Patent: Apr. 2, 2024

(54) MAGNETIC GUIDING DEVICE

(71) Applicant: Physik Instrumente (PI) GmbH & Co. KG, Karlsruhe (DE)

(72) Inventors: Bernhard Guddei, Roeschwoog (FR); Michael Hohmann, Baden-Baden (DE); Daniel Göll, Söllingen (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 253 days.

(21) Appl. No.: 17/633,736

(22) PCT Filed: Aug. 10, 2020

(86) PCT No.: PCT/EP2020/072336
§ 371 (c)(1),
(2) Date: Feb. 8, 2022

(87) PCT Pub. No.: WO2021/028367
PCT Pub. Date: Feb. 18, 2021

(65) Prior Publication Data
US 2022/0294326 A1    Sep. 15, 2022

(30) Foreign Application Priority Data
Aug. 9, 2019    (DE) .......................... 10 2019 211 986

(51) Int. Cl.
*H02K 41/03*    (2006.01)
*H02K 1/17*    (2006.01)
*H02K 5/173*    (2006.01)

(52) U.S. Cl.
CPC ............. *H02K 41/031* (2013.01); *H02K 1/17* (2013.01); *H02K 5/173* (2013.01); *H02K 2201/03* (2013.01)

(58) Field of Classification Search
CPC .. H02P 9/32; H02P 9/34; H02P 25/032; H02P 25/06; H02P 25/062; H02P 25/064;
(Continued)

(56) References Cited

U.S. PATENT DOCUMENTS

2002/0021050 A1    2/2002  Togashi et al.
2004/0004405 A1*   1/2004  Ausderau ............... H02K 16/04
                                                              310/15

FOREIGN PATENT DOCUMENTS

DE    102004050313 A1    4/2006
DE    102004050338 A1    4/2006
(Continued)

OTHER PUBLICATIONS

International Search Report (PCT/ISA/210) with translation and Written Opinion (PCT/ISA/237) dated Nov. 12, 2020, by the European Patent Office as the International Searching Authority for International Application No. PCT/EP2020/072336.
(Continued)

*Primary Examiner* — Antony M Paul
(74) *Attorney, Agent, or Firm* — BUCHANAN INGERSOLL & ROONEY PC

(57) ABSTRACT

The present invention relates to a magnetic guiding device having a stator and a slide movable along a guiding direction relative to the stator, the stator and the slide being magnetized or magnetizable such that a magnetic field extending through the stator and the slide generates a magnetic supporting force on the slide acting along the guiding direction. To improve the running properties of the slide by avoiding differential slip, jerking and varying friction, according to the invention, the magnetic field extending through the stator and the slide simultaneously generates a magnetic pretensioning force which urges the slide and the stator against each other.

20 Claims, 4 Drawing Sheets

(58) Field of Classification Search
CPC .......... H02P 25/28; H02P 25/30; H02P 6/006; H02P 6/00; H02P 6/32; H02P 7/00; H02P 7/30; H02P 7/32; H02P 7/34; H02P 6/005; H02P 6/30; H02P 21/12; H02P 21/22; H02P 21/28; H02P 1/00; H02P 6/157; H02P 2207/05; H02K 1/17; H02K 41/031; H02K 5/173; H02K 7/09; H02K 2201/03

See application file for complete search history.

(56) References Cited

FOREIGN PATENT DOCUMENTS

| | | |
|---|---|---|
| DE | 102006053041 A1 | 5/2008 |
| JP | 2002064968 A | 2/2002 |

OTHER PUBLICATIONS

Office Action (Notification Prior to Examination) dated Oct. 20, 2022, by the Israel Patent Office in corresponding Israeli Patent Application No. 290431 and an English translation of the Office Action. (5 pages).

Office Action (Notice of Grounds of Rejection) dated May 9, 2023, by the Japanese Patent Office in corresponding Japanese Patent Application No. 2022-507920, and an English Translation of the Office Action. (23 pages).

Office Action (Notice of Non-Final Rejection) dated Nov. 28, 2023, by the Korean Patent Office in corresponding Korean Patent Application No. 10-2022-7007597, and an English Translation of the Office Action. (15 pages).

\* cited by examiner

MAGNETIC GUIDING DEVICE

The present invention relates to a magnetic guiding device having a stator and a slide movable relative to the stator along a guiding direction, the stator and the slide being magnetized or magnetizable such that a magnetic field extending through the stator and the slide generates a magnetic supporting force on the slide along the guiding direction, according to the preamble of claim 1.

A device generating a magnetic supporting force is known from US 2004/0004405 A1. It can be combined with a linear drive to completely or largely compensate the load to be moved by the linear drive, for example, when the linear drive is arranged vertically, so that the linear drive is relieved and essentially only has to be designed in view of the dynamic load due to the moved load. FIG. 19 of US 2004/0004405 A1 and the corresponding description part disclose a linear drive having a magnetic supporting force device coupled thereto, wherein the moving parts are guided in a stator. A guiding means suited for guidance can be realized, for example, via a profile rail.

However, without any additional measures, a differential slip, jerking, and varying friction occur in a profile rail or a similarly designed guiding means which deteriorate the running properties of the moving parts with respect to the stator. The jerking of the guide can inter alia cause a jamming of the moving parts and finally lead to increased efforts due to reworking due to a bad controllability of the position.

The object underlying the invention is to provide a magnetic guiding device supplying a magnetic supporting force along the guiding direction and simultaneously providing improved running properties of the slide with respect to the stator by avoiding differential slip, jerking, and varying friction.

To achieve this object, the present invention provides the magnetic guiding device according to claim 1.

The object is analogously achieved by the magnetic field extending through the stator and the slide additionally generating a magnetic pretensioning force urging the slide and the stator against each other. Thereby, a corresponding pressure force is exerted between the slide and the stator, such that differential slip, jerking, and varying friction can be avoided, and the slide can be guided at the stator with improved running properties. By the inventive magnetic guiding device, in contrast to guiding devices with a mechanical pretensioning of the slide, e. g. buckling spring arrangements, no additional higher-order resonances or dynamics are introduced into the system (guide, drive), resulting in advantages in the position control. Moreover, with longer strokes, there are advantages of the installation space with respect to the guiding devices with a mechanical pretensioning of the slide. The magnetic guiding device according to the invention thus forms a magnetic arrangement for simultaneously generating a preferably constant supporting force in the running direction and a transverse pretensioning force, in particular for monorail guidance system, to improve the running properties of the slide. The transverse pretensioning force, however, does not only provide advantages for monorail guidance systems, but, for example, also for guiding means embodied as air bearings, since thereby, one can do without the cumbersome provision of a vacuum to generate the pretensioning force.

Advantageous further developments of the invention are the subject matter of the subclaims.

It can make sense for the magnetic field extending through the stator to be formed by one or more permanent magnets and for the magnetic supporting force to be exclusively generated by the magnetic field formed by one or more permanent magnets.

It can be advantageous for the stator and/or the slide to be embodied, at least in sections, magnetically, and otherwise optionally to be magnetically conductive. In this embodiment, only a few or no external means for generating the magnetic field are required.

However, it can also make sense for the supporting force and/or the pretensioning force to be constant along the guiding direction across a region defining a travel range of the slide. Thereby, along the travel range, particularly even and jerk-free movements can be achieved. This simultaneously results in a simpler controllability and an increased positioning accuracy of a drive coupled with the guiding device. The two limits of the travel range of the slide result from the positions along the guiding direction where the overlap between the stator and the slide is minimal or maximal, respectively (cf. FIG. 1*a*).

However, it can prove to be of assistance for the supporting force to vary along the guiding direction in a movement of the slide with respect to the stator, preferably to vary constantly, preferably linearly. It is thus conceivable that the supporting force decreases in a movement of the slide with respect to the stator in the guiding direction, and increases in a movement of the slide with respect to the stator against the guiding direction. Preferably, the supporting force increases as the stator and the slide increasingly overlap (cf. FIG. 4).

It can be here of advantage that the cross-sectional shape of the stator varies in a cutting plane oriented perpendicularly with respect to the guiding direction, in particular across the travel range, and/or that the distance between the slide and the stator varies.

However, it can also prove to be useful for the slide to be movable along the guiding direction in opposite directions. In such an embodiment, the slide is positionable reversibly between the two ends of the guiding distance and can be repeatedly moved along the guiding distance. The supporting force preferably acts in an accelerating manner on the slide in the guiding direction (e. g. +Z-direction), and acts in a delaying manner on the slide against the guiding direction (e. g. −Z-direction).

It can make sense for the stator to have a guide profile for guiding the slide along the guiding direction, wherein the guide profile preferably blocks all degrees of freedom for the movement of the slide, except for the movement along the guiding direction. Preferably, the slide grips over the stator in a positive manner in a cutting plane oriented vertically to the guiding direction, just as e. g. a maglev train rail system grips over the rail in a positive manner.

It can also be practicable for the guiding direction to extend along a straight line or along a circular path. In the first case, the guiding means e. g. serves as a linear guide, and in the second case, as a rotary or rotational guide. With these embodiments, there is a broad field of application for the guiding device according to the invention. Rotary or rotational guides can be particularly advantageously employed in the field of ball bearings to which a torque is applied.

It can prove to be useful for the magnetic pretensioning force to act at least partially, or else completely, in the direction of the gravitational force of the slide. In this embodiment, the magnetic field has an opposite effect compared to a maglev train rail system since it does not reduce or cancel the gravitational force of the slide on the stator, as is the case in a maglev train rail system, but increases the force effect between the slide and the stator, in addition to the gravitational force of the slide. In this embodiment, a particularly good improvement of the running properties of the slide is achieved. While it is basically possible to also increase the pretensioning force between the slide and the stator by a greater mass of the slide, this measure is considered as disadvantageous since the greater mass of the slide leads to a higher overall weight, deteriorated dynamics, and finally higher costs of the guiding device. Moreover, the increase in the pretensioning force by mass is only applicable in a horizontal movement, not however, in a vertical movement, as in this case, the gravitational force acts in parallel to the guiding direction and not perpendicular to it; consequently, a higher overall weight does not lead, in a vertical movement, to a higher contact pressure between the slide and the stator. By the solution according to the invention, there is no frictional bearing of the compensation force (e. g. like in buckling spring arrangements of spiral tension springs), so that advantages result in the positioning control compared to frictional systems.

Here, it can make sense for the stator and the slide to form together, when they mutually overlap, i. e. within the travel range, an approximately closed ring profile within which the magnetic field is guided, wherein the approximately closed ring profile is preferably present in a plane perpendicular to the guiding direction, wherein the profile axis of the approximately closed ring profile preferably extends along or in parallel with the guiding direction. With this design, high magnetic forces in and perpendicular to the guiding direction can be particularly easily generated.

It can prove to be practical for the stator or the slide to have an open ring profile with a gap, wherein the respective other element of the stator and the slide bridges this gap to form the approximately closed ring profile together. With this design, the slide and the stator can be magnetically coupled in a particularly effective and space-saving manner. A profile extending along a closed line is referred to as a ring profile. This closed line can e. g. be polygonal, rectangular, round, oval, or circular. A ring profile can be referred to as approximately closed if the respective other element of the stator and the slide noticeably reduces the gap formed by the stator or the slide, and both elements are arranged along a closed line, in particular, if both elements are (more strongly) magnetically coupled in this arrangement by the bridging of the gap. In this case, a bridging of the gap in the sense of the invention is present even if there is no contact between the slide and the stator because the slide and the stator are movable relative with respect to each other and have to remain movable relative with respect to each other.

However, it can also be advantageous for the stator or the slide to have a C-profile or a U-profile as an open ring profile, wherein the respective other element of the stator and the slide supplements the C-profile or the U-profile to an O-profile as the approximately closed ring profile. Here, the cross-sectional profile perpendicular to the guiding direction is referred to as the profile. Such basic profiles are available at low costs and can be coupled to a ring profile in a simple manner.

It can prove to be useful for magnetic poles of the stator and/or the slide to be oriented in the same direction or in opposite directions along the lines of magnetic flux of the magnetic field extending through the stator and the slide. In this design, the magnetic force acting between the stator and the slide is intensified in a simple manner. If the magnetic poles of the stator and/or the slide are directed in opposite directions along the lines of magnetic flux of the magnetic field extending through the stator and the slide, the directions of the pretensioning force and the supporting force are reversed.

It can also be appropriate for the stator and/or the slide to be composed of at least one permanent magnet and/or at least one magnetically conductive element, wherein the permanent magnet and/or the magnetically conductive element preferably have/has a constant cross-sectional shape along the guiding direction, wherein the permanent magnet and/or the magnetically conductive element preferably have/has a polygonal, rectangular, in particular cuboid cross-sectional shape. Here, the cross-sectional profile perpendicular to the guiding direction is referred to as the profile. A cross-sectional shape whose external or internal angle is 90° or 270° is referred to as polygonally rectangular.

It can also be advantageous for the slide to be adjustable relative to the stator in a plane perpendicular to the guiding direction, preferably along and/or perpendicular to the lines of magnetic flux of the magnetic field extending through the stator and the slide, preferably such that the compensation force and/or the pretensioning force are/is adjustable by adjusting the distance between the stator and the slide. In this design, the guiding device according to the invention can be purposefully configured for certain applications. Moreover, work tolerances can be particularly easily compensated by adjusting the relative positions of the slide and the stator.

However, it can also make sense for the guiding device to be embodied as a linear guide or rotary or rotational guide. With these designs, the invention offers a broad field of application.

Terms and Definitions

Supporting Force

Within the scope of the present invention, the term supporting force designates a force acting on the slide which in particular intensifies, reduces, compensates or even overcompensates other forces acting on the slide in the guiding direction. However, the supporting force can also act on a slide with no force with respect to the guiding direction, for example, in a horizontally oriented magnetic guiding device, for example, to achieve higher dynamics in one direction, or to enforce a movement into a certain end position in case of a mains failure.

DETAILED DESCRIPTION OF THE PREFERRED EMBODIMENTS

Preferred embodiments of the present invention will be described below in detail with reference to the enclosed figures.

Figure 1A:
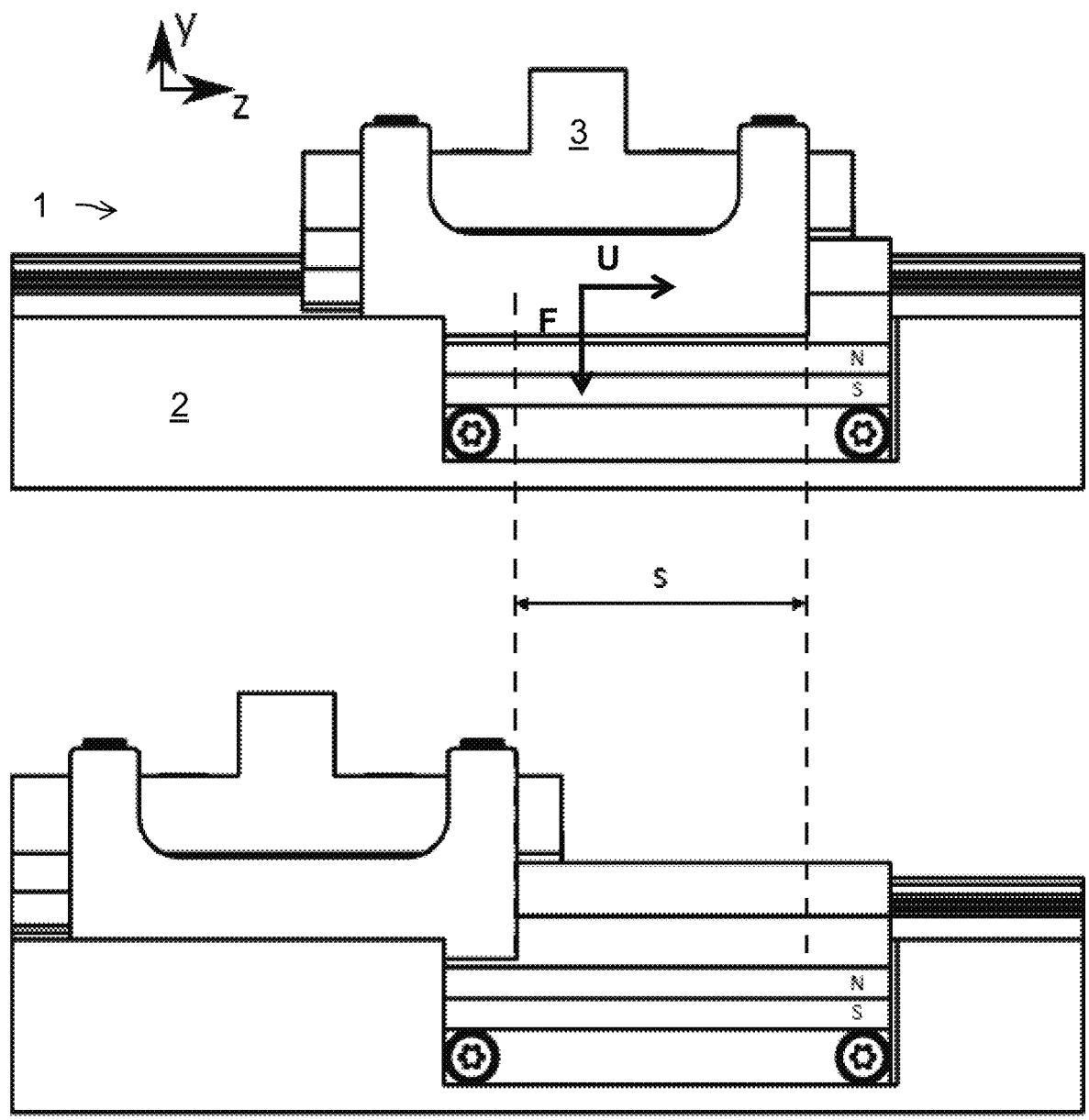
FIGS. 1a and 1b schematically show the construction of a magnetic guiding device embodied as a linear guide according to the invention, on the one hand in a side view a) in different positions at both ends of the travel range, and on the other hand in a sectional view b) perpendicular to the guiding direction.

FIG. 1 shows, in view a), an embodiment according to the invention of a magnetic guiding device 1 embodied as a linear guide from the side with a view onto a Y-Z plane, and in view b), a section through this guiding device 1 in an X-Y plane in the drawn-in coordinate system.

Figure 1B:
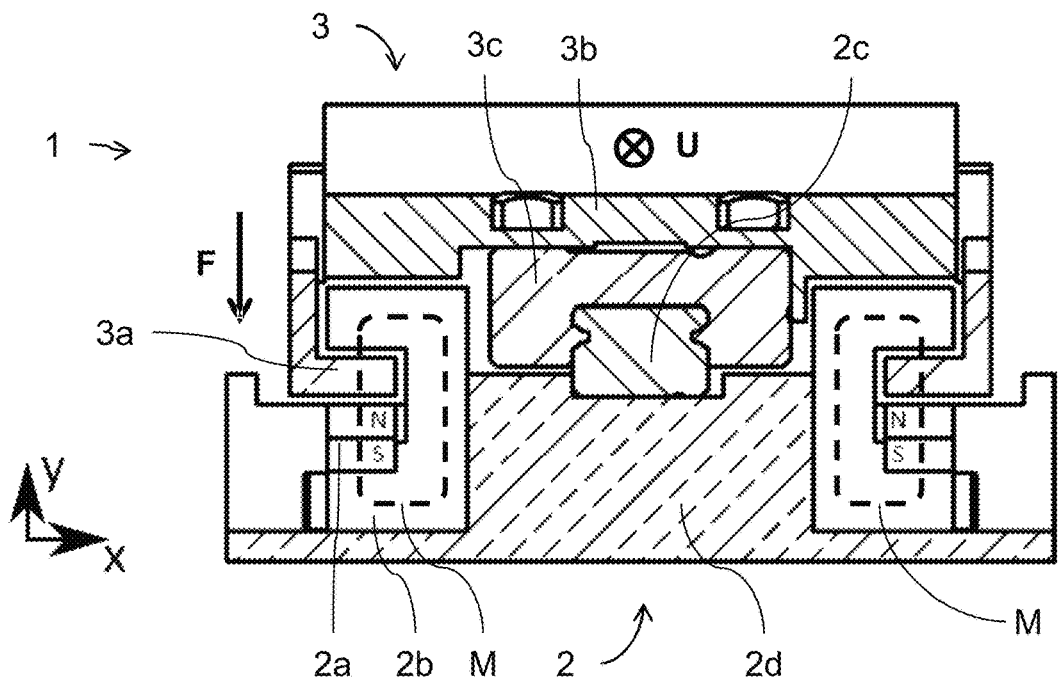

The guiding device 1 represented in FIG. 1 comprises a stator 2 and a slide 3 movable relative to the stator 2 along (i. e. into and against) a guiding direction Z. The guiding direction of the guiding device 1 extends in the +Z-direction in the drawn-in coordinate system. The section in FIG. 1b) extends perpendicular to the guiding direction in the X-Y plane. The stator 2 and the slide 3 are magnetized or magnetizable such that a magnetic field M extending through the stator 2 and the slide 3 generates a magnetic supporting force U onto the slide 3 acting along the guiding direction. In the present embodiment, for example, only the stator 2 comprises a permanent magnet. The slide can be embodied to be ferromagnetic, e. g. as an iron part, to increase the magnetic forces, but it can also be embodied as a permanent magnet. According to the invention, the magnetic field M extending through the stator 2 and the slide 3 generates a magnetic pretensioning force F which urges the slide 3 and the stator 2 against each other. The supporting force U acts against a force acting on the slide 3, such as a spring force or—in a vertical arrangement—the gravitational force. In certain application cases, it can also be advantageous for the supporting force U to completely compensate a force acting on the slide 3, that means, for example, a spring force or the gravitational force, and thus to maintain the slide 3 in a balance of forces. The supporting force U acts in the +Z-direction, i. e. in the guiding direction, in the present case. The pretensioning force F acts in the −Y-direction in the present exemplified embodiment.

The stator 2 that is embodied symmetrically in the cross-section in the X-Y plane and magnetically in sections, has a profile guide rail 2c over which a corresponding guiding carriage 3c of the slide 3 is movably mounted along the guiding direction Z. With the guide carriage 3c, the slide 3 is guided along the guiding direction, while all other possible degrees of freedom of the movement of the slide 3 are blocked. As is schematically represented in the sectional view according to FIG. 1b), on each side of the profile guide rail 2c, a permanent magnet 2a having a rectangular cross-section is arranged in a magnetically conductive element 2b of iron with a C-shaped cross-sectional profile. Both legs of the C-profile face away from the profile guide rail 2c. The permanent magnet 2a is each arranged on the lower leg of the C-profile. The magnetically conductive elements 2b are in contact with a base 2d supporting the profile guide rail 2c. The magnetic north pole N of the permanent magnet 2a is oriented in the +Y-direction, while the magnetic south pole faces in the −Y-direction. The magnetically conductive element 2b which is C-shaped in its cross-section thus supports the permanent magnet 2a at the inner lower leg to form, together with the same, an open ring profile with a gap that remains between the magnetic north pole N and the inner upper leg of the magnetically conductive element 2b.

The slide 3 is embodied to be magnetically conductive at least in sections, in the present case, and comprises, a platform 3b guided on the profile guide rail 2c together with the guide carriage 3c, and two L-shaped and magnetically conductive legs 3a arranged laterally thereof in the cross-section in the X-Y plane. The legs 3a grip over the stator 2 transverse to the guiding direction and penetrate, with the ends facing each other, each into the respective gap between the permanent magnet 2a and the inner upper leg of the magnetically conductive element 2b of the stator 2. The ends of the legs 3a facing each other bridge this gap magnetically and complete the open ring profile of the stator 2 to an approximately closed ring profile within which the magnetic field M extends that is schematically indicated in FIG. 1b in a dot-dash line.

The pretensioning force F is in this embodiment not constant along the guiding direction Z across the complete travel range S of the slide 3 but varies in response to the position of the slide 3 with respect to the stator 2, wherein the pretensioning force F increases as the overlap of the slide 3 and the stator 2 increases, and decreases as the overlap of the slide 3 and the stator 2 decreases. At each position of the travel range S, i. e. at each position of the mutual overlap of the stator and the slide, it is, however, ensured that the pretensioning force F exceeds a certain minimum value. The supporting force U is, however, constant along the guiding direction Z across the complete travel range S of the slide 3.

The legs 3a of the slide 3 are, in the present case, adjustably fixed to the platform 3b of the slide 3 in the Y-direction and/or in the X-direction. Thereby, the slide 3 is adjustable into two perpendicular directions relative to the stator 2 in an X-Y plane lying perpendicular to the guiding direction, both along the lines of magnetic flux of the magnetic field M extending through the stator 2 and the slide 3 in the +/−Y-direction and perpendicular thereto in the +/−X-direction (insertion direction), so that both the supporting force U and the pretensioning force F are adjustable by adjusting the distance between the stator 2 and the slide 3. It is conceivable that instead of the legs 3a of the slide 3, the magnetically conductive elements 2b are fixed to the base 2d to be adjustable in the Y-direction and/or in the X-direction to achieve an adjustability of the supporting force U and the pretensioning force F. It is finally conceivable that both the legs 3a of the slide 3 and the magnetically conductive elements 2b are arranged to be adjustable in the Y-direction and/or in the X-direction. Of course, the magnetic properties of the slide 3 and the stator 2 can be exchanged, that means the magnetic circuit can be fixed to the slide 3 and not, or additionally also, to the stator 2.

Operating Principle

The legs 3a of the slide 3 are drawn towards the respective permanent magnet 2a of the stator 2 by the magnetic force passing through the slide 3 and the stator 2. This force of attraction generates the pretensioning force F by which the platform 3b and the guide carriage 3c of the slide 3 are pressed against the profile guide rail 2c of the stator 2.

Within the travel range S, there is a constant supporting force U in the running direction since the slide 3 is drawn into the arrangement by magnetic forces, similar as disclosed in US 2004/0004405 A1.

By the relative positioning of the slide 3 with respect to the stator 2—or their magnetically effective parts, such as the permanent magnet 2a and the magnetically conductive C-profile 2b—both the pretensioning force F acting in the direction of the stator 2 and the supporting force U acting in the guiding direction Z are adjustable. The pretensioning force F is primarily set by approaching the slide 3 to the permanent magnet 2a of the stator 2 in the +/−Y-direction. The supporting force U is primarily set via the penetration depth of the slide 3 into the gap formed by the permanent magnet 2a and the magnetically conductive element 2b of the stator 2 in the +/−X-direction.

Figure 2:
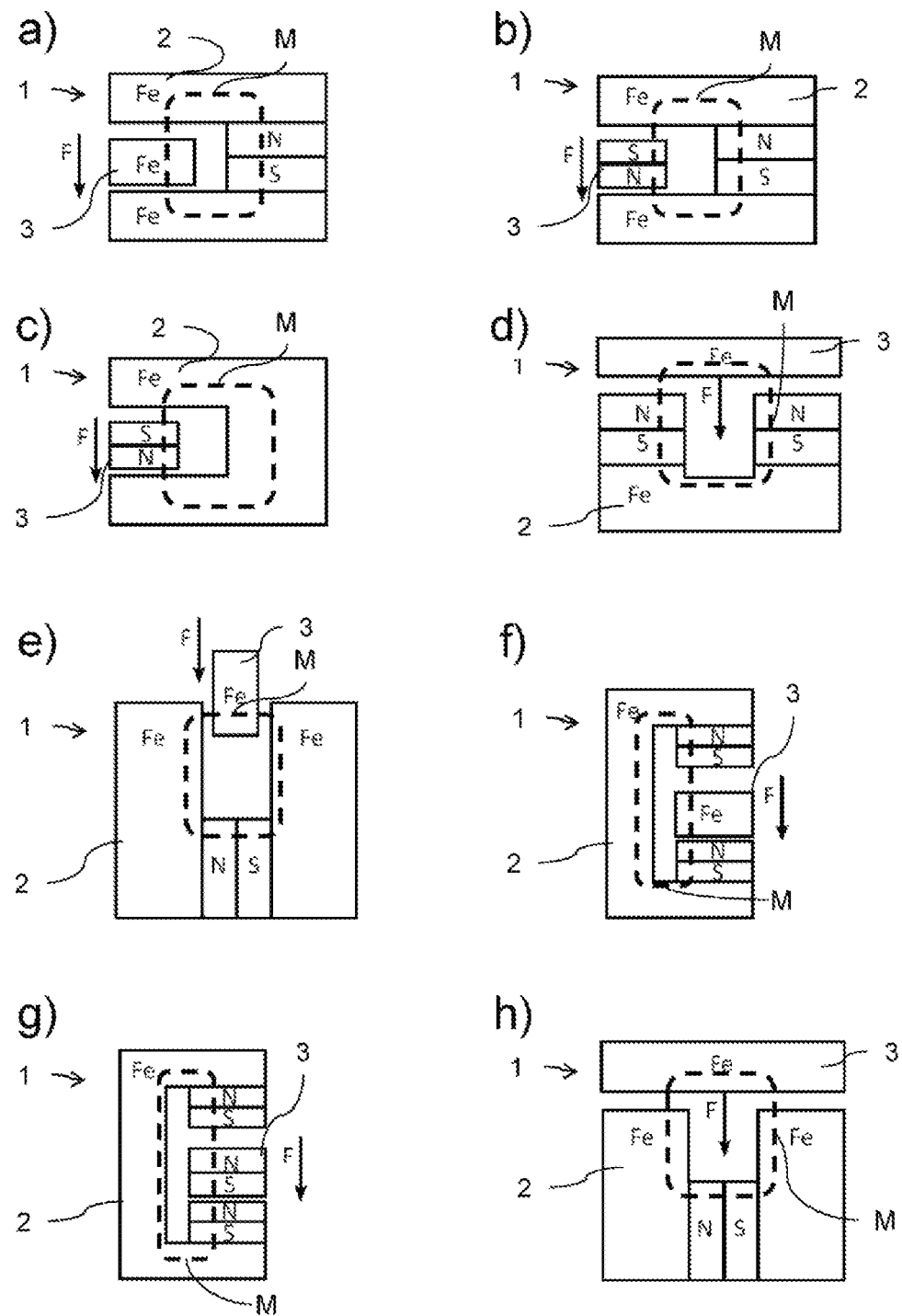
FIG. 2 shows, in the schematic sectional views a) to h), further embodiments of the guiding device according to the invention with various configurations of the slide and the stator.

FIG. 2 shows, in the schematic sectional views a) to h), further embodiments of the guiding device 1 according to the invention on the basis of the embodiment according to FIG. 1, however, with different configurations of the stator 2 and the slide 3. For representing purposes, in FIG. 2, only the magnetically effective parts of the stator 2 and the slide 3 are represented in a simplified manner. It is self-evident that the stator 2 and/or the slide 3 can have further parts apart from the parts represented in views a) to h). In the following views a) to h) of FIG. 2, reference numeral Fe designates a magnetically conductive ferromagnetic or paramagnetic element, e. g. of iron, while symbols N and S, respectively, indicate the magnetic poles of a permanent magnet (N for north pole, S for south pole). The sections represented in views a) to h) each extend perpendicular to the guiding direction or in the X-Y plane within the overlap region of the stator 2 and the slide 3, i. e. within the travel range S. Preferably, all profiles have a constant cross-sectional shape along the guiding direction.

In the embodiment according to FIG. 2a, the stator 2 comprises two magnetically conductive ferromagnetic or paramagnetic elements Fe, in the cross-section preferably identical and rectangular, between which a permanent magnet N/S is arranged to form a C-shaped open ring profile with a gap. The opening between the legs of the C-profile is located in the left in view a). The permanent magnet N/S has a higher height than any magnetically conductive element of the stator 2 and has preferably less than half the width. The ferromagnetic or paramagnetic slide 3 which also has a rectangular cross-section is located in the gap between the legs of the C-shaped stator 2 to bridge the gap and complete the open C-shaped ring profile of the stator 2 to an approximately closed ring profile. The resulting magnetic field M is here symbolically represented by the dotted line. Optionally, the slide 3 is adjustable relative to the stator 2 in the X-Y plane, preferably along and perpendicular to the lines of magnetic flux of the magnetic field M extending through the stator 2 and the slide 3, so that the supporting force U as well as the pretensioning force F are adjustable by adjusting the distance between the stator 2 and the slide 3.

In contrast to the design according to FIG. 2a, in the embodiment according to FIG. 2b, the slide 3 is embodied as a permanent magnet having a rectangular cross-section. The magnetic poles N/S of the stator 2 and the slide 3 are rectified along the lines of magnetic flux of the magnetic field M extending through the stator 2 and the slide 3. The other features of this design correspond to the design according to FIG. 2a.

In contrast to the design according to FIG. 2b, in the design according to FIG. 2c, the stator 2 is embodied as a magnetically conductive integrally formed C-profile of ferromagnetic or paramagnetic material. Only the slide 3 comprises a permanent magnet. The other features of this design correspond to the design according to FIG. 2b.

In the design according to FIG. 2d, the stator 2 is composed of two permanent magnets having a rectangular cross-section and one magnetically conductive element having a C-shaped or rectangular cross-section of ferromagnetic or paramagnetic material, such as e. g. iron. These magnetized or magnetically conductive parts together form a C-profile with an opening on the upper side. The slide 3 which has a rectangular cross-section and is embodied as a magnetically conductive element bridges the gap formed between the legs of the stator 2 on the front side to form an approximately closed ring profile.

In the design according to FIG. 2e, the stator 2 is composed of two magnetically conductive elements having a rectangular cross-section and one permanent magnet having a rectangular or square cross-section. The north pole N and the south pole S of the permanent magnet face to different sides or magnetically conductive elements. These magnetized or magnetically conductive parts together form a C-profile with an opening on the upper side. The slide 3 embodied to be magnetically conductive and having a rectangular cross-section is located in the gap formed between the legs of the stator 2 to complete the open ring profile of the stator 2 to an approximately closed ring profile.

In the design according to FIG. 2f, the stator 2 comprises a magnetically conductive C-profile of ferromagnetic or paramagnetic material with an opening on the right side. A permanent magnet having a rectangular cross-section is located with its magnetic north pole N in abutment against the inner side of the upper leg of the C-profile, while the magnetic south pole S of a further permanent magnet having a rectangular cross-section is in contact with the inner side of the lower leg of the C-profile. The slide 3 embodied as a magnetically conductive ferromagnetic or paramagnetic element and having a rectangular cross-section is located in the gap formed between the permanent magnets of the stator 2 to complete the open ring profile of the stator 2 to an approximately closed ring profile.

In contrast to the design according to FIG. 2f, in the design according to FIG. 2g, the slide 3 itself is embodied as a permanent magnet, wherein the magnetic poles N/S of the stator 2 and the slide 3 are rectified along the lines of magnetic flux of the magnetic field M extending through the stator 2 and the slide 3. The other features of this design correspond to the design according to FIG. 2f.

In contrast to the design according to FIG. 2e, the slide 3 in the design according to FIG. 2h is not located between the legs of the C-profile but bridges the gap formed between the legs of the stator 2 on the front side, similar to the design according to FIG. 2d, to form an approximately closed ring profile. The other features of this design correspond to the design according to FIG. 2e or the design according to 2d.

The designs represented in FIG. 2 are only given by way of example and are not to be understood as a restriction. It is self-evident that further embodiments can be realized within the scope of the invention.

Figure 3:
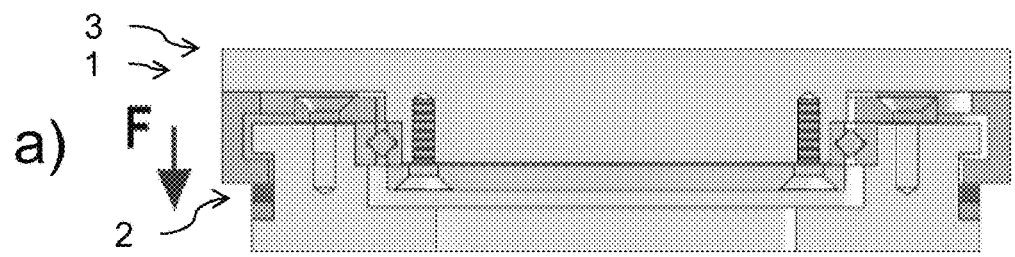
FIG. 3 shows, in view a) a sectional view and in view b) a perspective representation of a guiding device embodied as a rotary or rotational guide according to the invention which can be employed, for example, for pretensioning and generating a constant torque for a ball bearing.
Figure 3:
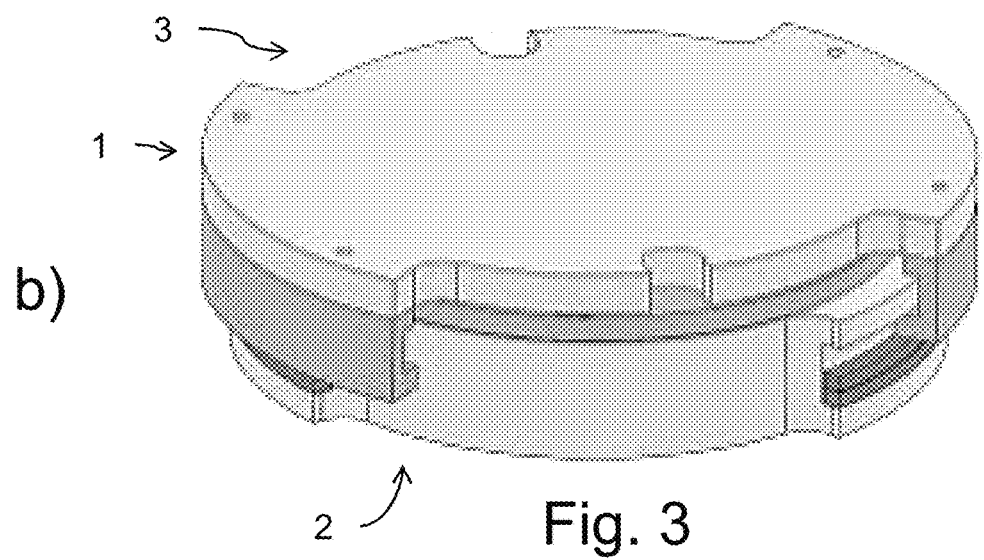

In the embodiment according to FIG. 3, the guiding device according to the invention is part of a rotary actor wherein the guiding direction extends along a circular path. This design is advantageous, for example to pretension ball bearings while simultaneously generating a constant torque.

It will be understood that an inversion of the guiding device, in which the above-described stator acts as a rotor and the above-described rotor acts as a stator, is within the scope of professional actions against the background of the teaching according to the invention.

Figure 4:
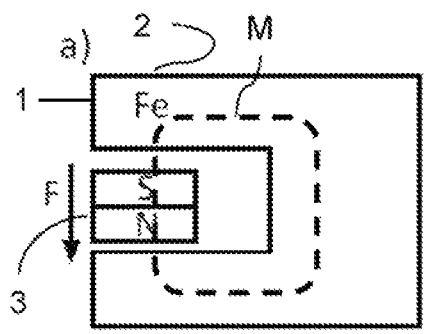
FIG. 4 shows in a), b), and c) schematically different embodiments of guiding devices according to the invention in which the supporting force U varies over the travel range, wherein in embodiments a) and b), a sectional view in a plane perpendicular to the guiding direction is represented each in the left half of the image, and a side view each in the right half of the image, and wherein in embodiment c), a sectional view in a plane perpendicular to the guiding direction is represented in the left half of the image, and a plan view in the right half of the image.
Figure 4:
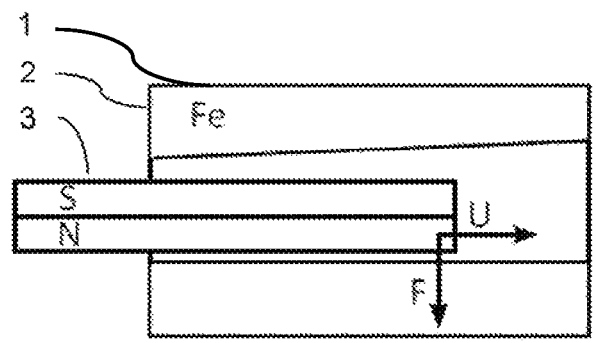
Figure 4:
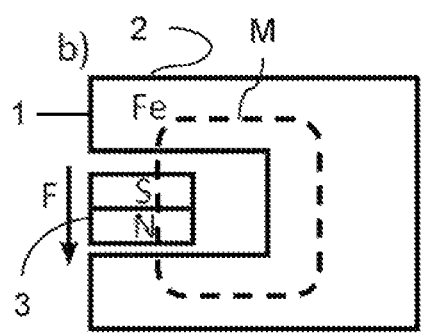
Figure 4:
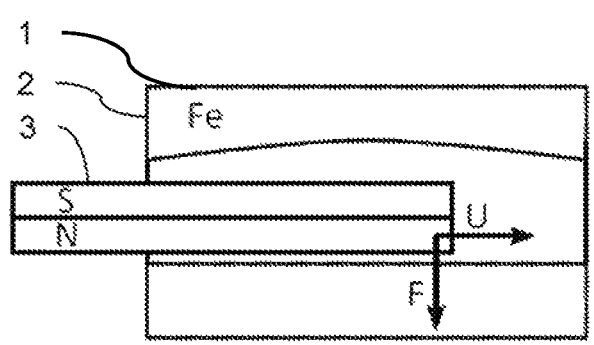
Figure 4:
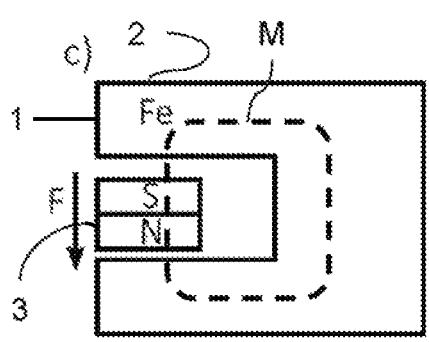
Figure 4:
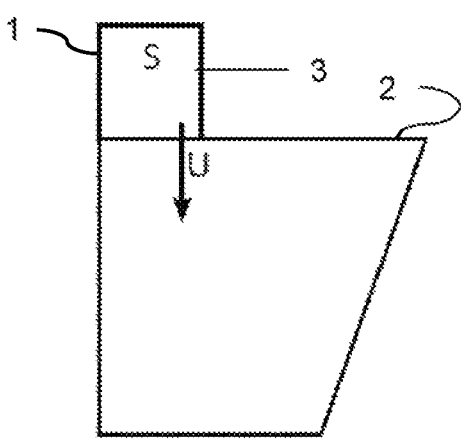

FIG. 4 shows three different embodiments a), b), and c) in which the supporting force U varies over the travel range. In these three embodiments, the cross-sectional shape of the stator 2 in a cutting plane oriented perpendicularly to the guiding direction Z along the guiding direction Z, in particular over the travel range, and/or the distance between the slide 3 and the stator 2 are/is not constant. Thereby, depending on the position of the slide 3 along the travel range with respect to the stator 2, a supporting force U having a different amount is exerted on the slide 3. Of course, this also has an effect on the pretensioning force F. The pretensioning force F, however, also inter alia depends on the overlap of the slide 3 and the stator 2 and is therefore not constant anyway.

In the embodiments a) and c) shown in FIG. 4, the supporting force U changes the further the slide 3 is inserted in the stator 2, e. g. because the magnetically conductive cross-sectional area of the stator 2 and/or the distance between the slide 3 and the stator 2 change/changes along the guiding direction Z at least in some areas.

In the embodiment b) shown in FIG. 4, the supporting force U first decreases over the travel range, then increases again.

By such designs, the supporting force U exerted on the slide 3 can be selectively adapted to the respective application case.

Of course, the principle shown in FIG. 4 can be transferred to all stator profiles shown in FIG. 2.

LIST OF REFERENCE NUMERALS 1 guiding device
2 stator
2a permanent magnet
2b magnetically conductive element
2c profile rail guide
2d base
3 slide
3a leg
3b platform
3c guide carriage
X-Y plane perpendicular to the guiding direction
Z guiding direction
U supporting force
M magnetic field
S travel range
F pretensioning force

The invention claimed is:

1. Magnetic guiding device comprising:
a stator; and
a slide movable with respect to the stator along a guiding direction (Z), wherein the stator and the slide are magnetized or magnetizable such that a magnetic field extending through the stator and the slide will generate a magnetic supporting force (U) onto the slide acting along the guiding direction (Z), wherein the magnetic field extending through the stator and the slide will simultaneously generate a magnetic pretensioning force (F) which will urge the slide and the stator against each other.

2. Magnetic guiding device according to claim 1, wherein the magnetic field (M) extending through the stator is formed by one or more permanent magnets, and the magnetic supporting force (U) is exclusively generated by the magnetic field (M) formed of one or more permanent magnets.

3. Magnetic guiding devices according to claim 1, wherein the stator and/or the slide are/is embodied to be magnetic at least in sections.

4. Magnetic guiding device according to claim 1, wherein the supporting force (U) is constant along the guiding direction (Z).

5. Magnetic guiding device according to claim 1, wherein the supporting force (U) will vary in a movement of the slide with respect to the stator along the guiding direction.

6. Magnetic guiding device according to claim 1, wherein the slide is configured to be movable into opposite directions along the guiding direction (Z).

7. Magnetic guiding device according to claim 1, wherein the stator has a guide profile for guiding the slide along the guiding direction (Z), and wherein the guide profile blocks all degrees of freedom for the movement of the slide (3), except for the movement along the guiding direction (Z).

8. Magnetic guiding device according to claim 1, wherein the guiding direction (Z) extends along a straight line or along a circular path.

9. Magnetic guiding device according to claim 1, wherein the magnetic pretensioning force (F) will act at least partially or else completely in a direction of a gravitational force of the slide.

10. Magnetic guiding device according to claim 9, wherein the stator or the slide has a C-profile or a U-profile as an open ring profile, wherein a respective other element of the stator and the slide supplements the C-profile or the U-profile to an O-profile as an approximately closed ring profile.

11. Magnetic guiding device according to claim 1, wherein the stator and the slide together form an approximately closed ring profile, when they mutually overlap, within which the magnetic field (M) is guided, wherein the approximately closed ring profile is present in a plane perpendicular to the guiding direction (Z), wherein the profile axis of the approximately closed ring profile extends along or in parallel to the guiding direction (Z).

12. Magnetic guiding device (1) according to claim 11, wherein the stator or the slide have an open ring profile with a gap, wherein a respective other element of the stator and the slide bridges this gap to together form the approximately closed profile.

13. Magnetic guiding device according to claim 1, wherein magnetic poles (N/S) of the stator and/or the slide are oriented in a same direction or in opposite directions along the line of magnetic flux of a magnetic field (M) extending through the stator and the slide.

14. Magnetic guiding device according to claim 1, wherein the stator and/or the slide are/is composed of at least one permanent magnet and/or at least one magnetically conductive element (Fe), wherein the permanent magnet and/or the magnetically conductive element (Fe) have/has a constant cross-sectional shape along the guiding direction (Z), wherein the permanent magnet and/or the magnetically conductive element (Fe) have/has a polygonal, rectangular, cross sectional shape.

15. Magnetic guiding device according to claim 1, wherein the slide is adjustable relative to the stator in a plane perpendicular to the guiding direction (Z), along and/or perpendicular to the lines of magnetic flux of the magnetic field (M) extending through the stator and the slide, such that the supporting force (U) and/or the pretensioning force (F) are/is adjustable by adjusting a distance between the stator and the slide.

16. Magnetic guiding device according to claim 1, wherein the guiding device is embodied as a linear guide or a rotary or rotational guide.

17. Magnetic guiding devices according to claim 1, wherein the stator and/or the slide are/is embodied to be magnetically conductive.

18. Magnetic guiding device according to claim 1, wherein the supporting force (U) is constant across a complete travel range (S) of the slide.

19. Magnetic guiding device according to claim 1, wherein the supporting force (U) will vary in a movement of the slide with respect to the stator along the guiding direction (Z) consistently, linearly.

20. Magnetic guiding device according to claim 1, wherein the stator and/or the slide are/is composed of at least one permanent magnet and/or at least one magnetically conductive element (Fe), wherein the permanent magnet and/or the magnetically conductive element (Fe) have/has a constant cross-sectional shape along the guiding direction (Z), wherein the permanent magnet and/or the magnetically conductive element (Fe) have/has a polygonal, rectangular cuboid cross sectional shape.

* * * * *